PARSELS & HEDGES.
Platform-Spring Coupling.
No. 113,335. Patented April 4, 1871.
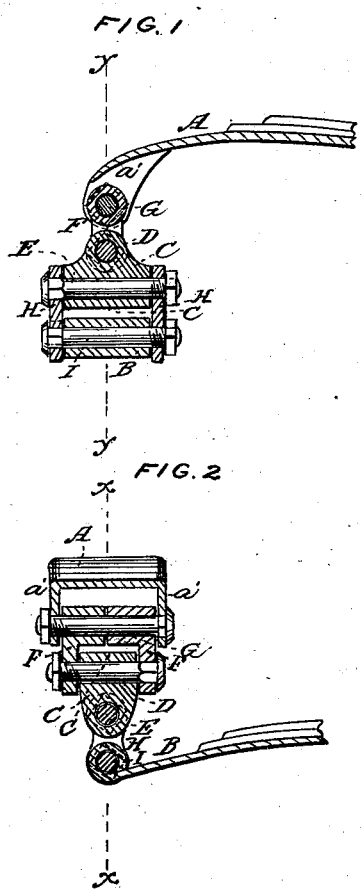

United States Patent Office.

BENJAMIN T. PARSELS AND JOHN L. HEDGES, OF HANOVER, NEW JERSEY.

Letters Patent No. 113,335, dated April 4, 1871.

IMPROVEMENT IN PLATFORM-SPRING COUPLINGS.

The Schedule referred to in these Letters Patent and making part of the same.

*To all whom it may concern:*

Be it known that we, BENJAMIN T. PARSELS and JOHN L. HEDGES, of Hanover, in the county of Morris and State of New Jersey, have invented a new and useful Improvement in Platform-Spring Coupling; and we do hereby declare that the following is a full, clear, and exact description thereof, which will enable others skilled in the art to make and use the same, reference being had to the accompanying drawing forming part of this specification, in which—

Figure 1 is a detail vertical section of our improved coupling taken through the line $x\ x$, fig. 2.

Figure 2 is a detail vertical section of the same taken through the line $y\ y$, fig. 1.

Similar letters of reference indicate corresponding parts.

Our invention has for its object to furnish an improved coupling for platform-springs, which shall be simple in construction, strong, and durable, and which will allow the springs to lengthen under pressure without twisting or straining the springs; and It consists in the coupling constructed as hereinafter more fully described.

A represents the cross-spring, and

B the longitudinal spring, the ends of which are to be coupled together.

C is the central or main block of the coupling, through the upper part of which is formed a hole for the bolt D at right angles with the spring A, and through the lower part of which is formed a hole for the bolt E at right angles with the spring B and with the bolt D.

The bolt D also passes through holes in the lower ends of the yokes F, the hole in one or both yokes F being made square, so that the bolt D will not turn in them.

Through holes in the upper ends of the yokes F passes the bolt G, which also passes through holes in the lugs $a'$, formed upon the end of the spring A, the holes in one or both the lugs $a'$ being made square, so that the bolt G cannot turn in them.

The upper part of the yokes F are made wide, so as to meet each other, as shown in fig. 2, to form a wide bearing for the bolt G.

If desired, the upper ends of the yokes F may be made narrow, and a thimble, sleeve, or washer interposed between them; but we prefer the construction first described, as being less liable to wear the bolt and less liable to rattle.

The ends of the bolt E pass through holes in the upper ends of the yokes H, through holes in the lower ends of which the bolt I passes, which also pass through an eye formed upon the end of the spring B. The holes in one or both the yokes H through which the bolts E and I pass are made square, so that the said bolts cannot turn in the said yokes.

By this construction it will be observed that all the bearings where there is any movement are made wide, to diminish the wear and prevent rattling.

This construction also allows the springs to lengthen under pressure without twisting or straining the springs.

Having thus described our invention,

We claim as new and desire to secure by Letters Patent—

The cross-block C, combined with yokes F H and bolts D E I, as and for the purpose specified.

BENJAMIN T. PARSELS.
JOHN L. HEDGES.

Witnesses:
DAVID T. COOK,
JOSEPH KITCHELL, Jr.